May 12, 1959 — A. S. KNAPP — 2,886,686
ELECTRIC BAKER
Filed April 4, 1955
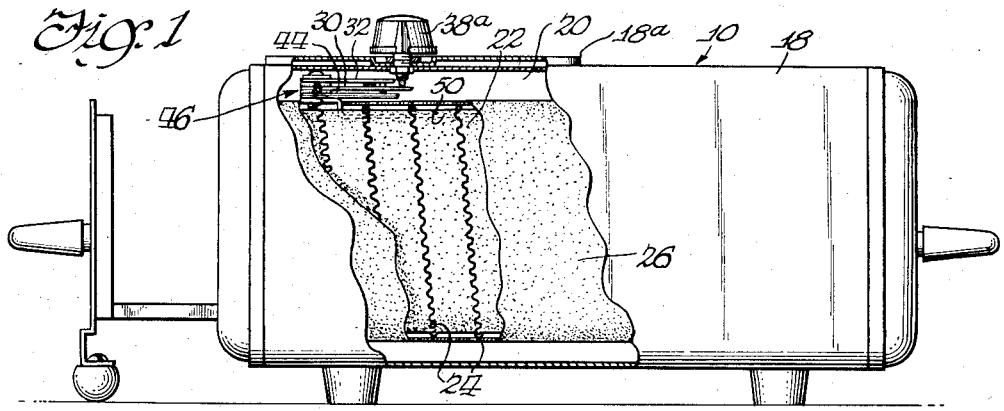
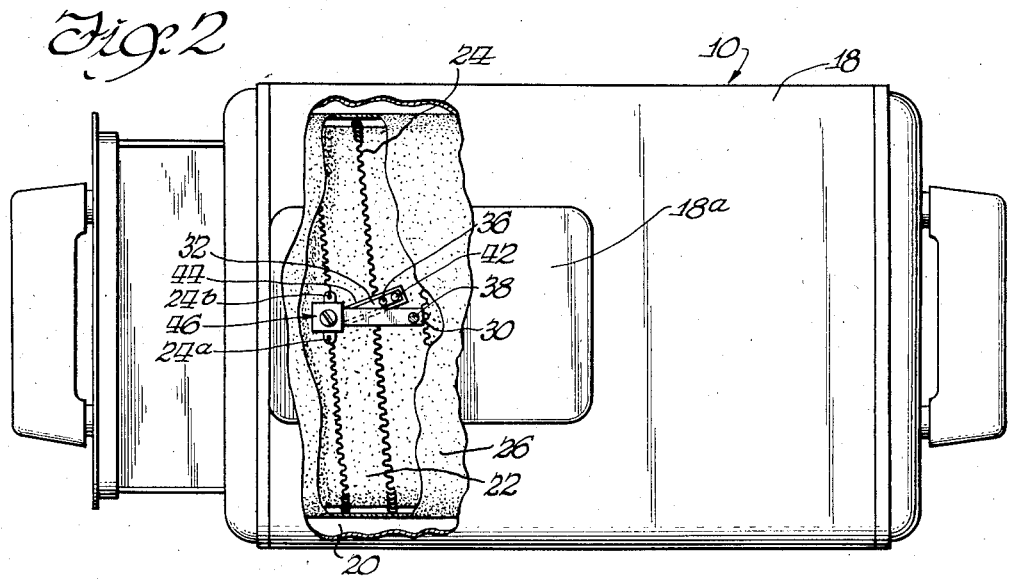
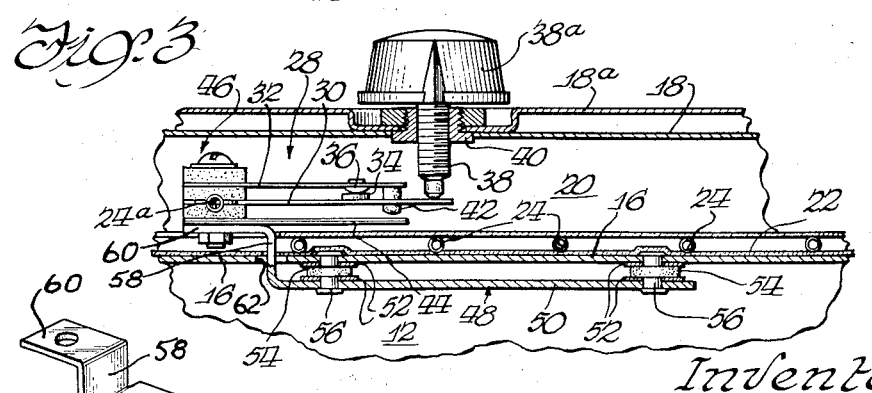
Inventor
Andrew S. Knapp
by Bair, Freeman & Molinare
Attorneys

United States Patent Office 2,886,686
Patented May 12, 1959

2,886,686

ELECTRIC BAKER

Andrew S. Knapp, St. Louis, Mo., assignor to Knapp-Monarch Company, St. Louis, Mo., a corporation of Delaware Application April 4, 1955, Serial No. 498,833

4 Claims. (Cl. 219—35)

This invention relates to an electric baker and more particularly to the heating controls therefor.

This particular invention relates to an improvement in the control means for the heating element of an electric baker.

Heretofore, it has been difficult to accurately control the heating in the baking chamber of an electric baker. One of the two principal problems involved the obtaining of a substantially uniform temperature throughout the entire baking chamber, and the other problem involved the accurate measurement of temperatures being obtained in the baking chamber.

In the copending patent application of John J. Kueser, Serial No. 503,732 filed April 25, 1955, there is described a baker wherein the heating element is so constructed and arranged as to provide substantially a uniform temperature throughout the baking chamber of the baker. In addition, in said copending application, the heat sensitive member is mounted in direct contact with the outside surface of the shell which is immediately surrounding the baking space. While this latter arrangement provides much improved operation over previous constructions, nevertheless, there still exists the deficiency that the heat sensitive member is not directly measuring the temperature in the baking space. Furthermore the fact that in the copending application the heat sensitive member is in direct contact with a good heat conductor introduces another factor adverse to the accurate measurement of the exact temperature being attained in the baking space.

It is, accordingly, the object of this invention to provide an improved structural arrangement which permits of a more accurate measurement of the actual temperature being attained in an electric baker.

In the practice of this invention, the heat sensitive member is disposed within the interior of the baking space so as to be in direct contact with the heated air in said baking space, whereby a more accurate measurement of temperature in said baking space may be obtained.

Further objects and advantages of this invention will become apparent as the following description proceeds and the features of novelty which characterize this invention will be pointed out with particularity in the claims annexed to and forming part of this specification.

The details of construction which effect the disposing of the heat sensitive member within the baking space will be fully pointed out in the following specification and in the preferred embodiment of the invention shown in the drawings in which:

Figure 1 is a side elevation view of an electric baker with portions broken away to show the control switch arrangement;

Figure 2 is a top plan view, with portions broken away, of the device of Figure 1;

Figure 3 is an enlarged cross-section view of the control switch arrangement;

Figure 4 is a perspective view of the heat sensing and conducting member shown in Figure 3.

Referring now to the drawing, there is shown a baker 10 which encloses an elongated baking chamber or space 12 which opens through one end of the baker. A tray 14 is slidable axially into and out of the baking space 12.

The baker is of the type comprising an elongated inner shell 16 and an elongated outer shell 18 surrounding said inner shell 16 and spaced from said inner shell 16 to define, therebetween, an elongated annular space 20 within which is disposed the heating means for the baker.

The heating means includes an inner layer or sheet of asbestos insulation 22, or the like, wrapped around said inner shell 16, a heating element or member 24 wrapped spirally, or helically, around the inner insulation 22, and an outer layer of sheet of asbestos insulation 26, or the like, wrapped around the heating element 24 and disposed between said heating element and the outer shell 18 and, as clearly shown in Figures 1 and 3, said sheet of insulation 26 is disposed between the heating element 24 and the bimetal 44 spaced thereabove.

As explained in said copending application, the heating element 24 is so constructed and arranged, as to obtain substantially uniform heating throughout the axial length of said heating chamber 12.

Interposed in series in the electrical circuit, which includes the heating element 24, is a switch generally indicated at 28 which includes electrically conducting spring leaves 30 and 32 which respectively carry contacts 34 and 36. The leaf 30 is electrically connected to section 24a of heating element 24 and leaf 32 is electrically connected to section 24b of heating element 24. The resiliency of the spring leaf 30 biases said leaf upward, the upward movement thereof being limited by a control stem 38 which is threaded in ferrule 40 carried by outer shell 18. The control stem 38 extends outwardly of baker 10 and carries a knob 38a thereon to provide for selective manual control of the switch 28 so as to provide for selective setting of the temperature at which said switch 28 is opened upon the desired temperature being attained in the baking chamber 12. A temperature setting scale (not shown) may be carried on a name plate 18a that is mounted on outer shell 18.

The spring leaf 32 carries a projection 42 which is positioned across the path of movement of a bimetal member 44, said bimetal member being adapted to be responsive to temperature. The bimetal 44 and spring leaves 30 and 32 are mounted in a stack switch arrangement generally indicated at 46, wherein suitable insulation is provided to insulate the leaves 30 and 32 from each other and from said bimetal 44.

To provide that the bimetal 44 is responsive to substantially the true temperature being attained in the baking chamber 12, the bimetal 44 is shielded from heater element 24 by insulation 26 as shown in the drawings, and there is provided a heat sensing and conducting member 48 which is connected in direct engagement, and in heating conducting relation, with said bimetal member 44. This heat sensing and conducting member 48 includes an elongated portion 50 which is positioned in the baking space 12 enclosed by said inner shell 16 of the baker 10.

Within the baking chamber 12, the heat sensing member is rigidly mounted in spaced relation to the inner wall of inner shell 16 by means of washers 52, spacers 54, and rivets 56 which are carried by said inner shell 16 and which are preferably of low heat conductivity so as to reduce undesirable heat transfer between said member 48 and the inner shell 16.

The heat sensing and conducting member 48 includes a transverse portion 58 and a bimetal engaging portion 60. The inner shell 16 is apertured at 62. When assembled, the transverse portion 58 of heat sensing member 48 extends through aperture 62 and is positioned in spaced relation from the edges of aperture to avoid heat transfer and losses between member 48 and inner shell 16.

The bimetal engaging portion 60 of heat sensing and conducting member 48 has said stack switch arrangement 46 mounted thereon with the bimetal 44 held in close heat conducting engagement with said portion 60 of member 48. The heat sensing and conducting member thereby also serves as the support for said stack switch arrangement 46.

The spacing of heat sensing member 48 from the wall of inner shell 16 should be as small as possible to avoid obstructing the interior of the baking chamber, and yet be sufficiently far enough away from the wall of shell 16 to eliminate undesirable heat transfer between said heat sensing member 48 and said inner shell 16.

By the above arrangement, there is provided an improved means for communicating substantially the true temperature being obtained in space 12 to the thermally operated switch 26, thereby providing a system wherein may be used thermally operated switches that may be calibrated prior to their incorporation in a baker of the type disclosed, thereby providing a more simplified assembly procedure over those which require calibration of the switch after assembly in the final construction.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desired to secure by Letters Patent of the United States, is:

1. An electric baker comprising, in combination, spaced elongated inner and outer shells assembled to define an open ended body which encloses a baking space, heating means in the space between said spaced inner and outer shells, a thermostatic control means, including a thermally actuated motor element, for controlling said heating means, said thermostatic control means being positioned in the said space between said inner and outer shells, said inner shell having an aperture therein, a heat sensing and conducting member in heat conducting relation with said thermally actuated motor element to provide that the thermally actuated motor element is responsive to the heat sensed by said heat sensing member, said heat sensing member extending, from said space between said inner and outer shells, through said aperture in the inner shell and into the baking space enclosed by said inner shell, means of low thermal conductivity carried by said inner shell for engaging and rigidly mounting said heat sensing and conducting member within said baking space and for maintaining said heat sensing member spaced from said inner shell, and said thermostatic control being mounted on and supported by said heat sensing and conducting member.

2. An electric baker comprising, in combination, spaced elongated inner and outer shells assembled to define an open ended body which encloses a baking space, heating means in the space between said spaced inner and outer shells, a thermostatic control means, including a thermally actuated motor element, for controlling said heating means, said thermostatic control means being positioned in the said space between said inner and outer shells, said inner shell having an aperture therein, a heat sensing and conducting member in good heat conducting relation with only said thermally actuated motor element to provide that the thermally actuated motor element is responsive to the heat sensed by said heat sensing member, said heat sensing member extending, from said space between said inner and outer shells, through said aperture in the inner shell and into the baking space enclosed by said inner shell, and means including members of relatively low thermal conductivity carried by said inner shell and engaging and rigidly mounting said heat sensing and conducting member within said baking space and for maintaining said heat sensing member in spaced relation from said inner shell.

3. An electric baker comprising, in combination, spaced inner and outer shells assembled to define an open ended body which encloses a baking space, heating means in the space between said spaced inner and outer shells, a thermostatic control means, including a thermally actuated motor element, for controlling said heating means, said thermostatic control means being positioned in the said space between said inner and outer shells, said inner shell having an aperture therein, a heat sensing and conducting member in good heat conducting relation with only said thermally actuated motor element to provide that the thermally actuated motor element is responsive to the heat sensed by said heat sensing member, said heat sensing and conducting member extending, from said space between said inner and outer shells, through said aperture in the inner shell and into the baking space enclosed by said inner shell, and said heat sensing and conducting member being positioned within said baking space in spaced relation to said inner shell for restricting conductive heat flow from both the thermostatic control and heat sensing member to said inner shell of the baker.

4. An electric baker comprising, in combination, spaced inner and outer shells assembled to define an open ended body which encloses a baking space, heating means in the space between said spaced inner and outer shells, a thermostatic control means, including a thermally actuated motor element, for controlling said heating means, said thermostatic control means being positioned in the said space between said inner and outer shells, insulating means in the space between the spaced inner and outer shells shielding said thermally actuated motor element from said heating means, said inner shell having an aperture therein, a heat sensing and conducting member in good heat conducting relation with only said thermally actuated motor element to provide that the thermally actuated motor element is responsive to the heat sensed by said heat sensing member, said heat sensing member extending, from said space between said inner and outer shells, through said aperture in the inner shell and into the baking space enclosed by said inner shell, and said heat sensing and conducting member being positioned within said baking space in spaced relation to said inner shell for restricting conductive heat flow from both the thermostatic control and heat sensing member to said inner shell of the baker, whereby said heat sensing member is responsive principally to the heat of the fluid within the baking space.

References Cited in the file of this patent

UNITED STATES PATENTS

| | | |
|---|---|---|
| 1,188,734 | Clement | June 27, 1916 |
| 1,276,317 | Blagen | Aug. 20, 1918 |
| 1,530,585 | Vincent | Mar. 24, 1925 |
| 2,022,440 | Slough | Nov. 26, 1935 |
| 2,077,687 | Goldbert | Apr. 20, 1937 |
| 2,086,827 | Smith | July 13, 1937 |
| 2,267,386 | Winborne | Dec. 23, 1941 |
| 2,273,734 | Pearce | Feb. 17, 1942 |
| 2,597,695 | Braski | May 20, 1952 |
| 2,658,134 | Kircher | Nov. 3, 1953 |
| 2,683,795 | Sheidler | July 13, 1954 |